UNITED STATES PATENT OFFICE.

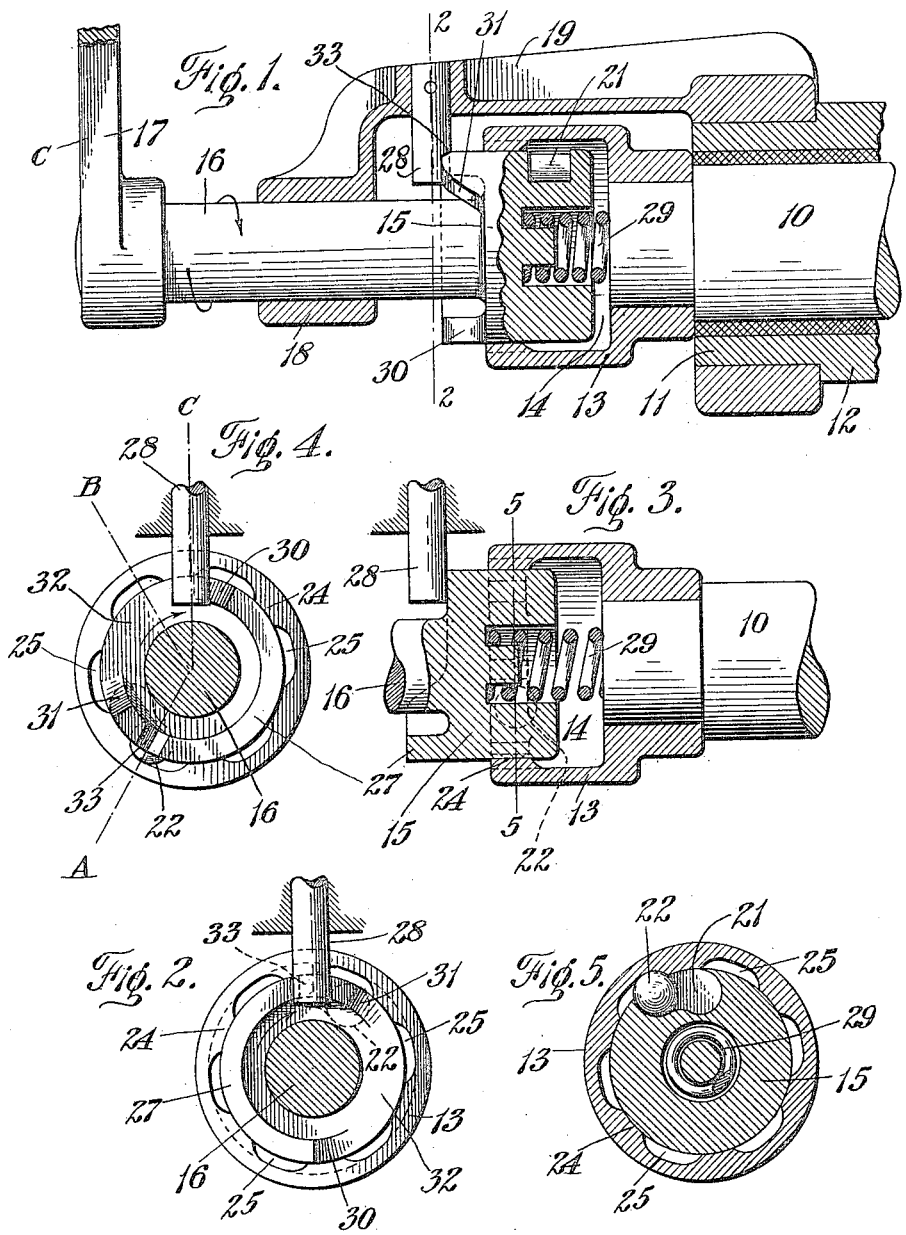

SILAS A. STRICKLAND, OF DETROIT, MICHIGAN, ASSIGNOR TO ALFRED C. WATERS, OF DETROIT, MICHIGAN.

STARTING MECHANISM FOR EXPLOSIVE-ENGINES.

1,140,416. Specification of Letters Patent. Patented May 25, 1915.

Application filed June 24, 1911, Serial No. 635,071. Renewed March 31, 1915. Serial No. 18,410.

*To all whom it may concern:*

Be it known that I, SILAS A. STRICKLAND, a citizen of the United States of America, residing at Detroit, in the county of Wayne and State of Michigan, have invented certain new and useful Improvements in Starting Mechanism for Explosive-Engines, of which the following is a specification, reference being had therein to the accompanying drawings.

This invention relates to a cranking device for starting explosive engines and the object of the invention is to produce an improved cranking device which is not liable to cause injury to the operator by preventing careless or incorrect use. In the present state of the art, safety cranking devices are provided with releasing mechanism designed to automatically release the crank from the crank shaft whenever the latter should kick back as a result of premature explosion. Such devices require a complication of parts and have not proved reliable and my invention is designed to present a more simple and safe construction by making the crank shaft only intermittently operative, that is capable of engaging the engine shaft only through a part of a revolution, and only through that part of the upstroke or upturn of the crank when the hand of the operator is pulling it upward, so that in case of a back stroke of the engine the crank flies away from the hand of the operator and is never in operative connection with the shaft during any other part of the revolution where the operator is liable to be hurt as it would be when his hand is in any other position. The limitation which is thereby given to the operation of my cranking device is of no practical consequence since it is the only correct and safe way in which the crank should be used. In case of a six cylinder engine the operative engagement of the starting crank through an arc of 120 degrees suffices to start one of the cylinders of the engine by a single impulse given to the starting shaft and an effective range of the crank through an arc of 120 degrees more or less may thus suit all the practical requirements of a starting device, and I have adapted this in the construction of my device, all as more fully hereinafter described and shown in the accompanying drawings, in which—

Figure 1 is a sectional elevation showing the parts in their normal position; Fig. 2 is a cross section of Fig. 1 on line 2—2; Fig. 3 is a view corresponding to Fig. 1 showing the parts in operative engagement; Fig. 4 is an end elevation of Fig. 3; and Fig. 5 is a cross section on line 5—5 of Fig. 3.

Referring to the drawings 10 denotes the end portion of the engine shaft to which the cranking device is applied; it is shown as mounted in a suitable journal 11 formed in portion 12 of the engine frame.

To the end of the engine shaft is secured the female clutch member 13 which forms the socket 14 on the end of the engine shaft. A coöperating male clutch member 15 projects into the socket formed by the female member and this member is preferably made integral with the starting shaft 16 which carries the starting crank 17 and is supported in a journal 18 which may be supported on the end of a bracket 19 secured to the engine frame.

The male member 15 is provided with a key pocket 21 in which is seated a ball shaped key 22, the pocket 21 being elongated and formed with an inclined bottom which permits the ball to roll from one end of the socket to the other in such manner that at the deeper end it is wholly withdrawn within the pocket while when in the opposite position it projects some distance beyond the pocket as shown in Fig. 5. The female clutch member is provided within its socket with an interiorly projecting interrupted annular flange 24 forming a series of recesses 25 of suitable depth to receive the projecting portion of the ball key when such key is in the locking position.

The male clutch member is provided with a cam flange 27 concentric with the starting shaft 16, and coöperates with a fixed pin 28 secured in the engine frame or bracket 19 and projecting into the path of this cam is kept in engagement therewith by the action of the spring 29. The cam flange extends only a part of a complete circle and has suitable inclines 30 and 31 at its ends between which the pin rides upon the intermediate portion 32.

The cam flange 27 is provided with a notch 33 for the pin 28 to engage in and form a stop to hold the parts in the normal, position shown in Fig. 1.

The parts being constructed as shown and described they are intended to operate as follows: In the normal position of the parts shown in Fig. 1, the starting crank is held in upright position by the engagement of the pin 28 into the notch 33 of the cam flange and the male and female clutch members are held out of operative engagement with each other since the ball key cannot engage with the portion of the socket into which it is withdrawn, the crank shaft of the engine is thus free to revolve independently of the starting shaft. The starting of the engine may be accomplished in the usual manner by turning the crank to the right, but it will be seen that on account of the continued engagement of the cam flange 27 with the pin 28 the clutch members will be held out of operative engagement for a portion of the revolution, that is, until the crank is approximately in the position indicated by the dotted line A in Fig. 4. In this position the cam flange has passed the pin 28 and the spring 29 is now free to act and move the male member into the position shown in Fig. 3 thereby carrying the ball key into positive engagement with one of the recesses 25 and the two clutch members are now in operative engagement with each other for the remaining part of a revolution, that is, while the operator is pulling the crank upward and has his hand in a position out of its way if it should fly back. Thus, if the crank shaft should turn back as a result of a premature explosion, the crank would simply be pulled out of his grasp, neither could it fly back any farther than to the position indicated at A at which point it would be again automatically released. In this connection attention is called to the positive locking and releasing action of the ball key in locking the clutch members together, the recesses 25 being of such depth and form to coöperate with the pocket 21 to seat the ball key (see Fig. 5) without producing any wedging action as is the case in friction clutches and there can be no failure of the clutch members to engage and disengage in a positive manner at the desired point.

In case of cranking a six cylinder engine it is obvious that if the starting shaft is in operative connection with the crank shaft of the engine for one-third of a revolution, it is sufficient to fire one of the cylinders, the retarded spark position of the handle being indicated by the dotted line B in Fig. 4. After passing this spark position the cam 27 will again become operative and throw the clutch members out of engagement. It is not necessary that the clutch members remain in operative engagement with each other until the spark zone is passed since by a powerful impulse given to the starting crank sufficient momentum may be imparted to the fly wheel to carry the engine over the dead center and thus the cam flange 27 may be made to throw the clutch members out of engagement just before the spark zone is reached. Should further cranking be required as in the case of engines with a lesser number of cylinders, the operator may continue to turn the crank in the same direction, but the easier and quicker way would be to turn the crank back into the position A and repeat the cranking as often as required. A series of impulses may thus be given to the crank shaft at rapidly succeeding intervals which effect the starting as readily as in the use of starting devices which operate by a sustained movement of the starting crank.

There is no possibility of cranking the engine in any other way than in the one described, as it is impossible for the clutch members to be in operative engagement with each other except during the interval of travel of the crank from about the position A to the normal upright position shown in Fig. 1 or thereabout. Should the crank be turned anti-clockwise the clutch members will not engage, thereby making it fool proof.

It is obvious that instead of having the pin 28 fixed and the cam 27 travel, the converse arrangement would be a mere mechanical equivalent. Instead of placing the spring 29 in a recess of the male clutch member it may be conveniently placed on the projecting end of the starting shaft. Other modifications such as may be required by using other known forms of clutches, may be readily made within the scope of my invention.

In the form of clutch shown in the drawing it is sufficient for the purpose of the invention to use only one ball if the pocket in which it is contained is placed in the relative position to the starting crank shown in Figs. 1 and 2. In this, the normal position, the ball is held in the deep end of the pocket and when the starting shaft is turned in the direction of cranking it will remain in the deep portion during the entire down stroke of the starting crank and only become operative during the upstroke (see Fig. 4). Thus for engines in which the starting is accomplished within one turn of the starting crank the cam might be omitted in using this particular form of clutch as the endwise motion of the starting shaft would not be necessary to prevent engagement of the clutch members during the down stroke. The cam, however, insures the positive disengagement of the clutch member no matter how the starting crank may be manipulated.

What I claim is:

1. In a starting device for explosive engines, the combination with the engine shaft, of a rotatably mounted and endwise slidable starting shaft provided with a crank, coöperating clutch members at the adjacent ends of the shafts adapted to engage and disengage by an endwise sliding movement of the starting shaft, a cam on said starting shaft, a fixed pin, a spring holding the cam in engagement with said pin and a notch in the cam for engagement with the pin.

2. In a starting device for explosive engines, the combination with the engine shaft, of a rotatably mounted and endwise slidable starting shaft provided with a crank, a female clutch member at the end of the engine shaft, a male clutch member at the end of the starting shaft and provided with a key pocket and a ball key adapted to coöperate with the female clutch member by the endwise sliding movement of the starting shaft, a cam on the starting shaft and a fixed pin coöperating therewith to impart an endwise movement to the starting shaft at predetermined positions in the movement of the crank in starting the engine.

3. In a starting device for explosive engines, the combination with an engine shaft, of a rotatably mounted and endwise slidable starting shaft, clutch members at the adjacent ends of said shafts with one of said members extending into the other, a movable key arranged between the walls of said members and adapted to lock one of said members relatively to the other, and means including a cam member adapted to slide said starting shaft and place said movable key in operative relation to said members.

4. In a starting device for explosive engines, the combination with an engine shaft, of a rotatably mounted and endwise slidable starting shaft, coöperating clutch members at the adjacent ends of said shafts, and locking means interposed between the walls of said clutch members and placed in an operatable position by an endwise movement of said starting shaft whereby said starting shaft is locked relatively to said engine shaft for rotative continuity in one direction.

In testimony whereof I affix my signature in presence of two witnesses.

SILAS A. STRICKLAND.

Witnesses:
ANNA C. RAVILER,
ADOLPH BARTHEL.

Copies of this patent may be obtained for five cents each, by addressing the "Commissioner of Patents, Washington, D. C."